United States Patent [19]

Kathrein et al.

[11] Patent Number: 5,116,419
[45] Date of Patent: May 26, 1992

[54] PROCESS FOR THE PREPARATION OF MAGNETIC IRON OXIDES AND THE PIGMENTS OBTAINED THEREFROM

[76] Inventors: Hendrik Kathrein; Peter Kiemle, both of P.O. Box 166, Bayer AG, D 4150 Krefeld-Uerdingen, Fed. Rep. of Germany

[21] Appl. No.: 448,505

[22] Filed: Dec. 11, 1989

[30] Foreign Application Priority Data

Dec. 24, 1988 [DE] Fed. Rep. of Germany ....... 3843848
Apr. 4, 1989 [DE] Fed. Rep. of Germany ....... 3910782

[51] Int. Cl.$^5$ ................................................ C09C 1/22
[52] U.S. Cl. .................... 106/459; 106/456; 106/480
[58] Field of Search ................ 106/456, 459, 480

[56] References Cited

U.S. PATENT DOCUMENTS

| | | | |
|---|---|---|---|
| 2,917,400 | 12/1959 | Edwards | 106/456 |
| 3,826,667 | 7/1974 | Cohen et al. | 106/456 |
| 4,066,564 | 1/1978 | Sasagawa et al. | 427/127 |
| 4,358,431 | 11/1982 | Brunn et al. | 106/456 |
| 4,382,822 | 5/1983 | Mayer | 106/456 |
| 4,594,267 | 6/1986 | Honma et al. | 427/127 |
| 4,702,775 | 10/1987 | Ostertag et al. | 106/456 |
| 4,923,519 | 5/1990 | Rodi et al. | 106/459 |
| 4,933,014 | 6/1990 | Kathrein et al. | 106/480 |
| 4,990,189 | 2/1991 | Wiese et al. | 106/459 |

Primary Examiner—William R. Dixon, Jr.
Assistant Examiner—Willie J. Thompson

[57] ABSTRACT

Magnetic iron oxide pigments useful in manufacturing magnetic recording media are prepared by a method which comprises coating a magnetic iron oxide core particle material having the composition FeO, wherein x is from 1.33 to 1.5, in a first step with a preliminary coating of a cobalt-containing bertholloid material or a material having the composition $Co_xFe^{II}_{1-x}Fe^{III}_2O_4$ wherein x is greater than zero but less than or equal to 1 and then in a second step the preliminary coated particle is coated with a cobalt compound.

14 Claims, No Drawings

PROCESS FOR THE PREPARATION OF MAGNETIC IRON OXIDES AND THE PIGMENTS OBTAINED THEREFROM

The present invention relates to a process for the preparation of magnetic iron oxide pigments containing cobalt and the pigments thereby obtained.

BACKGROUND OF THE INVENTION

Gamma-$Fe_2O_3$ magnetic pigments have coercivity of up to about 31 kA/m, ferrite magnetic pigments up to about 35 kA/m. Magnetic pigments with a much higher coercivity are increasingly used for the magnetic recording of signals with a greater storage density in the audio-, video- and data-storage fields. Various processes are known for increasing the coercivity of magnetic iron oxides.

According to DE-A 29 03 593, pigments with higher coercivity are obtained from alpha-FeOOH precursor compounds doped with cobalt. A coercive field strength of about 50 kA/m is obtained by using 1% cobalt and an FeO content of 20%. Disadvantages found in these pigments are the low print through value, insufficient magnetic stability and high dependence of the coercivity on the temperature.

Another method of obtaining high coercivity is described in DE-A 22 35 383, according to which a layer of cobalt ferrite is crystallised epitactically on a core of magnetic iron oxide in a strongly alkaline medium. These pigments have better print through and better magnetic stability than cobalt doped pigments but are not entirely satisfactory in their switching field distribution and in the aging erasability obtainable in tapes.

Processes for the preparation of magnetic iron oxide pigments with improved magnetostatic properties are described in DE-A 20 36 612, DE-A 22 43 231, DE-A 24 10 517 and DE-A 22 89 344. In these processes, a cobalt compound, generally cobalt hydroxide, is precipitated on the surface of the iron oxide core material. Suitable measures are then carried out to cause the cobalt to diffuse into the near-surface zones of the core material.

Processes in which compounds of cobalt and iron are precipitated separately in several layers on the iron oxide core material to improve the magnetostatic properties are described in DE-A 35 20 210, DE-A 36 31 193 and DE-A 33 44 299.

Although the magnetostatics of the pigments may be improved by using some of the processes mentioned above, all these processes have the disadvantage that a combination of high coercivity with good switching field distribution can only be achieved by carrying out a heat treatment above 100° C., which has an adverse effect on the magnetic stability of the oxides.

The problem therefore arose of finding an improved process for the preparation of magnetic iron oxide pigments which would be free from the disadvantages described above.

BRIEF DESCRIPTION OF THE INVENTION

It has now surprisingly been found that these requirements are fulfilled by a process for the preparation of magnetic iron oxide pigments having a coating of a cobalt compound, in which the magnetic iron oxide pigment used as core material is first coated with a layer of cobalt ferrite having the composition $$Co_xFe^{II}_{1-x}Fe^{III}O_4 \ (0 \leq x \leq 1)$$

or a cobalt-containing berthollid compound, on which a further cobalt compound is then applied. This process is the subject matter of the present invention.

DETAILED DESCRIPTION OF THE INVENTION

The process of the present invention is for the preparation of magnetic iron oxide pigments which comprises coating a magnetic iron oxide core particle material having the composition $FeO_x$, wherein x is from 1.33 to 1.5, in a first step with a preliminary coating of a cobalt-containing berthollid material or a material having the composition $Co_xFe^{II}1-_xFe^{III}_2O_4$ wherein x is greater than zero but less than or equal to 1 and then in a second step the preliminary coated particle is coated with a cobalt compound.

The magnetic iron oxide core material used may be gamma-$Fe_2O_3$—, $Fe_3O_4$ pigments or berthollid compounds having the composition $FeO_x(1.33 \leq x \leq 1.5)$. These iron oxides may contain one or more accompanying elements from the group comprising P, Zn, B, Si, Sn, Ge, Al, Mn, Cr, Ni, Mg and Ca.

According to the invention, the core is first covered with an iron (II,III) salt having an Fe(III) content of from 0 to 67% and a cobalt salt. Application of this preliminary coating is most preferably carried out in an alkaline medium. Coating may be carried out by the following method: iron oxide core material is dispersed in water, and the iron salt, the cobalt salt or solutions thereof and an alkaline solution are added. The alkaline solution may be added before or after dispersion of the iron oxide core material and before or after addition of the iron and cobalt salt solution.

Preliminary coating may be carried out under oxidising conditions, e.g. using air as oxidising agent, so that the iron(II) ions introduced with the iron salt solution are partly or completely oxidised. Alternatively, the process may be carried out under inert conditions, in which case it is assumed that the iron(II) ions of the layer of preliminary coating are oxidised by the iron-(III) ions of the core material.

In the preliminary coating process, the material is preferably stirred at temperatures from 20° C. to the boiling point until no Fe(II) is left in the solution.

Application of the cobalt-iron compound is followed by application of the cobalt compound by the addition of a cobalt salt or alkaline solution to the pigment suspension. The coating with cobalt may be carried out under oxidising or inert conditions.

The cobalt compound used may suitably be a Co(II) salt, especially $CoSO_4 \cdot 7H_2O$. Particularly good results are obtained when coating is carried out under such conditions that the Co content in the upper and preliminary coating layer amounts to 0.5 to 10%, based on the core material put into the process.

Cobalt coating is preferably carried out in an alkaline medium. The OH concentration during coating with iron/cobalt compound and with cobalt compound is from 0.1 to 10 mol/l, preferably from 0.3 to 5 mol/l.

The solids content of the core material in the suspension is from 30 g/l to 200 g/l, preferably from 50 to 150 g/l. The quantity of cobalt ferrite applied in the preliminary coating layer amounts to 2-25% of the core material used.

The pigment suspension is worked up by filtration, washing and drying.

This invention also relates to the pigments obtainable by the process according to the invention. Since these pigments are obtained without a heat treatment above 100° C., they are characterised by good magnetic stability.

The invention is illustrated below by means of Examples which are not, however, to be regarded as limiting the invention.

The magnetic data of the powder samples were determined with a sample vibration magnetometer in a magnetic field of 398 kA/m.

To determine the magnetostatic properties of the iron oxide pigments according to the invention, the pigment to be investigated was dispersed in a lacquer based on PVC/PVA and applied in a thin layer to a sheet of polyester. After orientation of the pigments in a homogeneous magnetic field of 80 kA/m, the test tapes were cured at 60° C. They were then cut up and the following data were obtained by means of a sample vibration magnetometer:

$_iH_c$—coercivity determined at 398 kA/m
Mr/ms—remanent magnetisation/saturation magnetisation SFD—switching field distribution.

EXAMPLE 1

480 g of bertholloid iron oxide pigment (coercivity: 33.7 kA/m, spec. saturation magnetisation: 90 nTm$^3$/g, specific surface area: 27 m$^2$/g, aspect ratio: 9:1, FeO content: 4.5%) were dispersed in 2.4 liters of water. A solution of 181 g of FeSo$_4$·7H$_2$O in 500 ml of distilled water and 30.5 g of CoSO$_4$·7H$_2$O in 83 ml of distilled water were added at 40° C. in a 5 l stirrer vessel while nitrogen was passed into the solution. After the addition of 632 ml of sodium hydroxide solution (740 g NaOH/l) and 218 ml of distilled water, the reaction solution was heated to 80° C. under nitrogen and gassed with air for 5 hours. A solution of 61 g of CoSO$_4$ in 167 ml of distilled water was then added and the reaction solution was heated to 95° C. and gassed with air for a further 16 hours.

The suspension was worked up by filtration and washing on a laboratory filter press and drying in a circulating air drying chamber at 30° C. The dried sample was compressed to a density of 0.90 g/ml and then worked up into a magnetic tape as described in the text.

COMPARISON EXAMPLE 1

480 g of the iron oxide core material described in Example 1 were dispersed in 2.4 l of distilled water. A solution of 272 g of FeSO$_4$·7H$_2$O in 500 ml of distilled water and a solution of 91.5 g of CoSO$_4$·7 H$_2$O in 250 ml of water were then added at 40° C. in a 5 l stirrer vessel while nitrogen was blown into the solution. After the addition of 842 ml of sodium hydroxide solution (740 g NaOH/l) the solution was heated to 80° C. under nitrogen and gassed with air for 6 hours. The suspension was worked up as described in Example 1.

COMPARISON EXAMPLE 2

480 g of the iron oxide pigment described in Example 1 were dispersed in 2.4 l of water and a solution of 181 g of FeSO$_4$·7H$_2$O in 500 ml of distilled water was added at 40° C. in a 5 l stirrer vessel while nitrogen was blown into the solution. After the addition of 632 ml of sodium hydroxide solution (740 g NaOH/l) and 218 ml of dist. water, the reaction solution was heated to 80° C. under nitrogen and gassed with air for 5 hours. A solution of 91.5 of CoSO$_4$·7H$_2$O in 250 ml of distilled water was then added and the reaction solution was heated to 95° C. and gassed for a further 16 hours.

The suspension was worked up as described in Example 1.

COMPARISON EXAMPLE 3

480 g of the iron oxide pigment described in Example 1 were dispersed in 2.4 l of distilled water and a solution of 181 g of FeSO$_4$·7H$_2$O in 500 ml of distilled water was added at 40° C. in a 5 l stirrer vessel while nitrogen was passed into the solution. After the addition of 632 ml of sodium hydroxide solution (740 NaOH per liter and 218 ml of distilled water, the reaction solution was stirred under nitrogen for 5 minutes. A solution of 91.5 g of CoSO$_4$·7H$_2$O in 250 ml of water was then added and the reaction solution was heated to 80° C. while nitrogen was passed through, and then gassed with air for 6 hours. The suspension was worked up as described in Example 1.

The experiments described in the Examples show that a sufficiently high coercive field strength combined with good switching field distribution can only be obtained with the process described. After-tempering or drying at temperatures above 100° C. is not necessary but need not be excluded.

TABLE 1

| | Packing density g/cm$^3$ | POWDER $_iH_c$ kA/m | Ms/p nTm$^3$/g | Mr/p nTm$^3$/g | $_iH_c$ kA/m | TAPE Mr/Ms | SFD |
|---|---|---|---|---|---|---|---|
| Example 1 | 1.27 | 52.0 | 95.9 | 48.1 | 55.5 | 0.87 | 0.47 |
| Comparison Example 1 | 1.26 | 45.4 | 92.7 | 46.0 | 52.7 | 0.85 | 0.61 |
| Comparison Example 2 | 1.21 | 42.1 | 94.9 | 43.8 | 45.6 | 0.88 | 0.43 |
| Comparison Example 3 | 1.13 | 48.5 | 94.9 | 47.3 | 50.7 | 0.88 | 0.49 |

What is claimed is:

1. Process for the preparation of magnetic iron oxide pigments which comprises coating a magnetic iron oxide core particle material having the composition FeO$_x$, wherein x is from 1.33 to 1.5, in a first step with a preliminary coating of a cobalt-containing bertholloid material or a material having the composition Co$_x$·Fe$^{II}_{1-x}$Fe$^{III}_2$O$_4$ wherein x is greater than zero but less than or equal to 1 and then in a second step the preliminary coated particle is coated with a cobalt compound.

2. Process according to claim 1 wherein the preliminary coating is an iron (II,III) salt having an Fe(III) content of from 0 to 67% and a cobalt salt.

3. Process according to claim 2 wherein the preliminary coating is applied to the core under oxidizing or inert conditions.

4. Process according to claim 3 wherein the preliminary coating is applied to the core under oxidizing conditions in the presence of air.

5. Process according to claim 1 wherein the preliminary coating is applied to the core under oxidizing or inert conditions.

6. Process according to claim 5 wherein the preliminary coating is applied to the core under oxidizing conditions in the presence of air.

7. Process according to claim 1 wherein the preliminary coating is applied to the core in an alkaline medium.

8. Process according to claim 1 wherein the preliminary coating is applied to the core by stirring core particles in a solution containing Fe(II) ions until no more Fe(II) can be found in the solution.

9. Process according to claim 1 wherein the cobalt compound is a Co(II) salt.

10. Process according to claim 9 wherein the cobalt (II) salt is $CoSO_4 \cdot 7H_2O$.

11. Process according to claim 1 wherein the coating is of sufficient amount that the Co content in the two coating layers is from 0.5 to 10%, by weight based on the core material.

12. Process according to claim 1 wherein the coating in the second step is in an alkaline medium.

13. Process according to claim 12 wherein the alkaline medium is aqueous alkali metal hydroxide with an —OH concentration of from 0.1 to 10 mol/l.

14. Magnetic iron oxide pigments prepared by the process according to claim 1.

* * * * *